US006467583B1

(12) United States Patent
Koura et al.

(10) Patent No.: US 6,467,583 B1
(45) Date of Patent: Oct. 22, 2002

(54) COMMUNICATIONS CONTROL SYSTEM FOR ELEVATORS

(75) Inventors: Kunikazu Koura, Tokyo (JP); Nobukazu Takeuchi, Tokyo (JP); Shougo Tatsumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/959,680

(22) PCT Filed: Apr. 12, 2000

(86) PCT No.: PCT/JP00/02387

§ 371 (c)(1),
(2), (4) Date: Nov. 5, 2001

(87) PCT Pub. No.: WO01/79102

PCT Pub. Date: Oct. 25, 2001

(51) Int. Cl.[7] ................................................. B66B 1/18
(52) U.S. Cl. ........................................ 187/247; 187/382
(58) Field of Search ................................ 187/247, 248, 187/277, 380, 382, 384, 385, 387, 388, 391, 373; 700/3, 20, 21, 27; 340/3.1, 3.5, 3.52, 7.46, 7.47; 709/208, 209, 211, 203, 217, 218, 219, 238, 245; 710/110

(56) References Cited

U.S. PATENT DOCUMENTS

| 4,082,164 A | * | 4/1978 | Sackin et al. | ............... 187/387 |
| 4,567,560 A | * | 1/1986 | Polis et al. | .................. 187/248 |
| 4,709,788 A | * | 12/1987 | Harada | ........................ 187/382 |
| 5,012,899 A | * | 5/1991 | Iwata | .......................... 187/277 |
| 5,019,960 A | * | 5/1991 | Ando et al. | .................. 187/277 |
| 5,398,782 A | * | 3/1995 | Talbot et al. | ................ 187/247 |
| 5,654,531 A | * | 8/1997 | Farabee et al. | ............. 187/247 |
| 5,804,778 A | * | 9/1998 | Chen et al. | .................. 187/248 |
| 5,936,211 A | * | 8/1999 | Kim | ........................... 187/248 |
| 6,349,795 B1 | * | 2/2002 | Tatsumi et al. | ............. 187/247 |

FOREIGN PATENT DOCUMENTS

| JP | 61-295979 | 2/1986 |
| JP | 62-116483 | 5/1987 |
| JP | 6-80322 | 3/1994 |

* cited by examiner

Primary Examiner—Jonathan Salata
(74) Attorney, Agent, or Firm—Leydig, Voit & Mayer, Ltd.

(57) ABSTRACT

A communications control system for elevators with control units inter-connected via a network and each control unit receives its own logical destination from an external location. The elevator communications control system includes a first control unit for detecting an initialized state of the network and operating as a network master node governing synchronization control among the control units when the first control unit is the first to send out, to the network, a network master node candidate request having a logical destination of the first control unit attached; and a second control unit for operating as a sub-node obeying the network master node when the initialized state of the network is not detected.

11 Claims, 12 Drawing Sheets

FIG. 3

| CONTROL UNIT FUNCTION CODE | CONTROL FUNCTION | DATA TYPE CODE |
|---|---|---|
| 1 | GROUP MANAGEMENT CONTROL UNIT 1 | 1 ~ 13 |
| 2 | RESPECTIVE CAR CONTROL UNITS 2 | 8, 11 |
| 3 | RESPECTIVE CAR CONTROL UNITS 3 | 9, 12 |
| 4 | RESPECTIVE CAR CONTROL UNITS 4 | 10, 13 |
| ...... | ...... | ...... |
| 10 | ELEVATOR HALL REGISTRATION CONTROL UNIT 5 | 1, 3 |
| 11 | ELEVATOR HALL REGISTRATION CONTROL UNIT 6 | 2, 4 |
| ...... | ...... | ...... |
| 20 | ELEVATOR HALL DISPLAY CONTROL UNIT 7 | 5, 6 |
| ...... | ...... | ...... |
| ...... | ...... | ...... |
| 40 | CONTROL UNIT FOR EXPANSION 8 | 1 ~ 13 |

FIG. 4

| DATA TYPE CODE | ELEVATOR HALL CALL REGISTRATION INFORMATION | ELEVATOR HALL REGISTRATION LAMP INFORMATION | DESTINATION FLOOR REGISTRATION INFORMATION | DESTINATION FLOOR REGISTRATION LAMP INFORMATION | ELEVATOR HALL DISPLAY INFORMATION | CAR ALLOCATION INFORMATION | RESPECTIVE ELEVATOR CONTROL INFORMATION |
|---|---|---|---|---|---|---|---|
| 1 | SERIES A | | | | | | |
| 2 | SERIES B | | | | | | |
| 3 | | SERIES A | | | | | |
| 4 | | SERIES B | | | | | |
| 5 | | | SERIES a | | | | |
| 6 | | | | SERIES a | | | |
| 7 | | | | | SERIES α | | |
| 8 | | | | | | RESPECTIVE ELEVATOR 2 | |
| 9 | | | | | | RESPECTIVE ELEVATOR 3 | |
| 10 | | | | | | RESPECTIVE ELEVATOR 4 | |
| 11 | | | | | | | RESPECTIVE ELEVATOR 2 |
| 12 | | | | | | | RESPECTIVE ELEVATOR 3 |
| 13 | | | | | | | RESPECTIVE ELEVATOR 4 | ns control system for elevators such as a communications control system for group management of elevators, which are joined, as plurality of elevators, via a network (a common transmission line).

COMMUNICATIONS CONTROL SYSTEM FOR ELEVATORS

TECHNICAL FIELD

The present invention relates to a communications control system for elevators such as a communications control system for group management of elevators, which are joined, as plurality of elevators, via a network (a common transmission line).

BACKGROUND ART

Description will be made of a conventional communications control system for elevators with reference to the drawings. FIG. 12 shows a structure of a conventional communications control system for elevators disclosed in Japanese Patent Application Laid-open No. 61-295979, Japanese Examined Patent Publication No. 6-39312.

In the conventional elevator communications control system, as shown in FIG. 12, three control units 91, 92 and 93 for controlling three elevators are provided as an example.

The respective control units 91, 92 and 93 have car control units CCa, CCb and CCc, respectively, for controlling its own elevator. In addition, the respective control units 91, 92 and 93 are integrally provided with group control units GCa, GCb and GCc for group management control processing being made into compact for distributed processing, and hall control units HCa, HCb and HCc for hall call control processing, respectively.

The respective control units 91, 92 and 93 additionally have an LSI (large-scale integrated circuit) Sa, Sb and Sc for transmitting, and information output from those is transmitted via a bus-form high speed transmission line 94.

On the hall side, corresponding to this example in which the system is configured into two series, a hall controller 95 consisting of a one-chip microcomputer (one-chip micon) is provided for each series of each hall. Each hall controller 95 is expressed by both a number (1 or 2) following the symbol S for indicating the series type and a number (1–m) for indicating the hall type, which are connected in series. For example, the hall controller 95 on series 1 side at floor m is specified as S1m.

These hall controllers 95 perform, for example, input processing of a hall call registration signal from a hall call registration button 96 and output processing of a lighting signal to a hall call registration lamp 97. Further, these hall controllers 95 are connected in a parallel fashion to each master node CPU Ma, Mb and Mc of the respective control units 91, 92 and 93 via transmission lines 98, 99 in the respective series.

In recent years, uses of buildings have been varied and an improvement in system functions, performance and expandability of elevator communications control systems applied therein is necessary.

In a conventional elevator communications control system described above a centralized processing method is used such that control units 91, 92 and 93 each have car control units CCa, CCb and CCc, respectively, for controlling their own respective elevators, and the elevator communications control system is integrally equipped with the group control units GCa, GCb and GCc for group management control processing, which are made compact for distributed processing, and the hall control units HCa, HCb and HCc for hall call control processing. In this conventional case, however, there was a problem in that the control units were complicated, and the processing power or availability of the system as a whole was diminished.

The present invention has been made in order to solve the above-mentioned problems, and therefore has an object of the present invention to provide a communications control system for elevators capable of optimally distributing functions of the system as a whole and assigning them to subsystems, and further capable of achieving improvement of total processing ability.

DISCLOSURE OF THE INVENTION

A communications control system for elevators according to the present invention is a communications control system for elevators, which is adapted so that a plurality of control units are inter-connected via a network, and that each control unit inputs its own logical destination from an external location in advance, wherein the elevator communications control system is equipped with: a first control unit for detecting an initialized state of the network and operating as a network master node governing synchronization controls among the plurality of control units when the first control unit is the first to send, to the network, a network master node candidate request command having the logical destination of the first control unit attached thereto; and a second control unit for operating as a sub-node obeying the network master node when the initialized state of the network is not detected.

A communications control system for elevators according to the present invention is such that when the first control unit detects a network master node candidate request command from another control unit, when the logical destination of the first control unit and the logical destination attached to the network master node candidate request command of the other control unit conform to specified conditions, the first control unit acts as the network master node; and when the logical destination of the first control unit and the logical destination attached to the network master node candidate request command of the other control unit do not conform to the specified conditions, the first control unit operates as a sub-node.

The elevator communications control system according to the present invention is such that when the control unit operating as the sub-node detects that the network master node is failing, when the control unit is the first to send to the network, a network master node candidate request command having its logical destination attached thereto, the control unit operates as a network master node governing the synchronization controls among the plurality of control units.

A communications control system for elevators according to the present invention is such that the control unit operating as the sub-node detects the network master node candidate request command from the other control unit operating as a sub-node, and operates as the network master node when its own logical destination and the logical destination attached to the network master node candidate request command from the other control unit conform to specified conditions.

A communications control system for elevators according to the present invention is a communications control system for elevators which is adapted so that the plurality of control units are inter-connected via the network; and each control unit inputs its own primary logical destination from an external location in advance, and each has a first correspondence table establishing correspondence among: the primary logical destination used for identifying the control unit, an elevator control function and a secondary logical destination for identifying information used by the control unit; and a second correspondence table establishing correspondence between the secondary logical destination and the information used by the control unit, wherein the elevator communications control system is equipped with a plurality of control units for referencing the first correspondence table and acting as an elevator control function corresponding to their own primary logical destination.

A communications control system for elevators according to the present invention is equipped with a first control unit which references the first correspondence table and corresponds to its own first primary logical destination therein, and which acts as an each elevator control unit for controlling ascending and descending of an elevator car; a second control unit which references the first correspondence table and corresponds to its own second primary logical destination therein, and which acts as an elevator hall registration control unit for controlling input processing of elevator hall call registration information from an elevator hall button registration device installed at an elevator hall on each floor, and output processing of elevator hall registration lamp information corresponding to the elevator hall call; and a third control unit which references the first correspondence table and corresponds to its own third primary logical destination therein, and which operates as a group management control unit for performing allocation controls for allocating an elevator in response to an elevator hall call registered based on the elevator hall call registration information.

A communications control system for elevators according to the present invention is such that each control unit refers to the second correspondence table; extracts the secondary logical destination corresponding to the information inputted from the external location; adds the secondary logical destination to the sending data and sends it to the network; and also extracts the secondary logical destination from data received from the network, and when the extracted secondary logical destination exists at a location in the first correspondence table corresponding to a primary logical destination the control unit takes in the received data.

A communications control system for elevators according to the present invention is such that, one of the plurality of control units detects an initialized state of the network, and operates as the network master node governing the synchronization controls among the plurality of control units when the control unit is the first to send out, to the network, a network master node candidate request command having the primary logical destination of the control unit attached thereto; and the rest of the plurality of control units operate as sub-nodes obeying the network master node when the initialized state of the network is not detected.

A communications control system for elevators according to the present invention is such that, when one of the plurality of control units detects a network master node candidate request command from another control unit, when its own primary logical destination and the primary logical destination attached to the network master node candidate request command from the other control unit conform to specified conditions, the control unit acts as the network master node; and when they do not conform to the specified conditions the control unit acts as a sub-node.

A communications control system for elevators according to the present invention is such that, when the control unit operating as a sub-node detects that the network master node is failing, the control unit operates as the network master node governing the synchronization controls among the plurality of control units when the control unit is the first to send out, to the network, a network master node candidate request command having the primary logical destination of the control unit attached thereto.

A communications control system for elevators according to the present invention is such that, the control unit operating as a sub-node operates as the network master node when the control unit detects a network master node candidate request command from another control unit operating as a sub-node, and its own primary logical destination and the primary logical destination attached to the network master node candidate request command from the other control unit conform to specified conditions.

BRIEF DESCRIPTION OF THE DRAWINGS

In the accompanying drawings:

FIG. 3 is a diagram showing a function code correspondence table;

FIG. 4 is a diagram showing a data type code table;

BEST MODE FOR CARRYING OUT THE INVENTION

Embodiment 1

Figure 1:
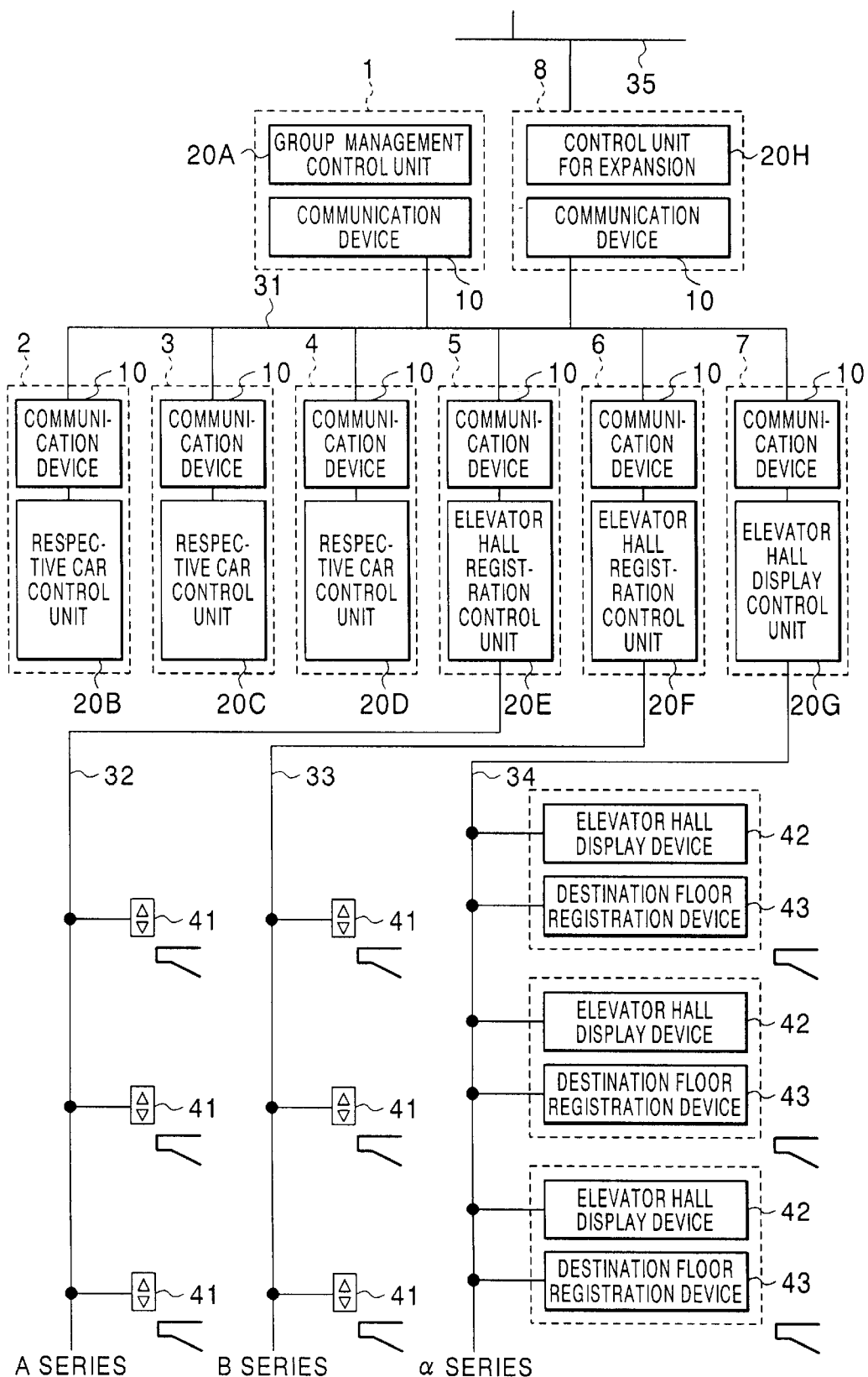
FIG. 1 is a block diagram showing a structure of a communications control system for elevators according to Embodiment 1 of the present invention.

Description will be made of a communications control system for elevators according to Embodiment 1 of the present invention, making reference to the drawings. FIG. 1 is a diagram showing a structure of the elevator communications control system according to Embodiment 1 of the present invention. Note, as will be described below, FIG. 1 shows the structure in a state that for each control unit the network master node and the sub-nodes are determined and each control function, such as a group management control function, are determined. Further, in each of the drawings the same reference numerals refer to the same or equivalent portions.

In FIG. 1, the communications control system for elevators is equipped with a group management control unit 1; respective car control unit 2; respective car control unit 3; respective car control unit 4; elevator hall registration control unit 5; elevator hall registration control unit 6; elevator hall registration control unit 7; and an expansion control unit 8, which are connected via a transmission channel 31.

Further, in the same figure, the group management control unit 1 has a communications device 10 and a group management control device 20A. The group management control unit 1 performs an allocation control of elevator car (not shown) in response to a registered elevator hall call based on an elevator hall call registration signal.

Further, in the same figure, the respective car control unit 2 has the communications device 10 and a respective car control device 20B. The respective car control unit 2 controls ascending and descending of the elevator car based on a car allocation signal originating from the group management control unit 1 for allocating cars in response to the elevator car call registration signal, and a car call signal originating from the car.

Similarly, the respective car control unit 3 has the communications device 10 and a respective car control unit 20C, and the respective car control unit 4 has the communications device 10 and a respective car control unit 20D. These respective car control units 3 and 4 have the same function as the function of the respective car control unit 2. Note that, the respective car control units 2, 3 and 4 and the car apparatus are joined by means of a transmission line, though this is not shown in the figure of this example.

Further, in the same figure, the elevator car registration control unit 5 has the communications device 10 and an elevator hall registration control device 20E. The elevator hall registration control unit 5 controls, via the transmission line 32, input processing of the elevator hall call registration signal from an elevator hall button registration device 41 installed on each floor, and output processing of an elevator hall registration light signal from the group management control unit 1 responding to the elevator hall call. Note that, in this example the elevator hall registration control unit 5 handles the elevator hall call registration information and the elevator hall registration light information of the three elevators of series A controlled by the respective car control units 2–4.

Similarly, the elevator hall registration control unit 6 has the communications device 10 and an elevator hall registration control device 20F. The elevator hall registration control unit 6 has the same functions as the functions of the elevator hall registration control unit 5. Note that, in this example the elevator hall registration control unit 6 handles the elevator hall call registration information and the elevator hall registration light information of the three elevators of series B controlled by the respective car control units 2–4.

Further, in the same figure, an elevator hall display control unit 7 has the communications device 10 and an elevator hall display control device 20G. The elevator hall display control unit 7 controls, via a transmission line 34, input processing of a destination floor registration signal originating from a destination floor registration device 43 installed at the elevator hall, and output processing of the car allocation signal and a destination floor registration light signal in response to the destination floor registration signal originating from the group management control unit 1. Note that, in this example the elevator hall display control unit 7 handles the destination floor registration information and the destination floor registration light information and the like, of the three elevators controlled by the respective car control units 2–4.

An elevator hall display device 42 installed on each floor performs display control of a display and the like of serial numbers of cars actually allocated, based on the car allocation signal originating from the elevator hall display control unit 7.

The destination floor registration device 43 installed on each floor performs input processing of an ON/OFF contact point signal originating from the destination registration button, and control of actual turning on and turning off of the light based on the destination registration light signal originating from the elevator hall display control unit 7.

Further, in FIG. 1 the expansion control unit 8 has the communications device 10 and an expansion control device 20H. The expansion control unit 8 is mutually joined with another network via a transmission line 35, and performs a bridge function for joining with another communications control system for group management of elevators. Further, the expansion control unit 8 is connected via the transmission line 35 to a personal computer installed in a management room, and the personal computer monitors a plurality of elevator group management communications control systems established throughout the building.

Figure 2:
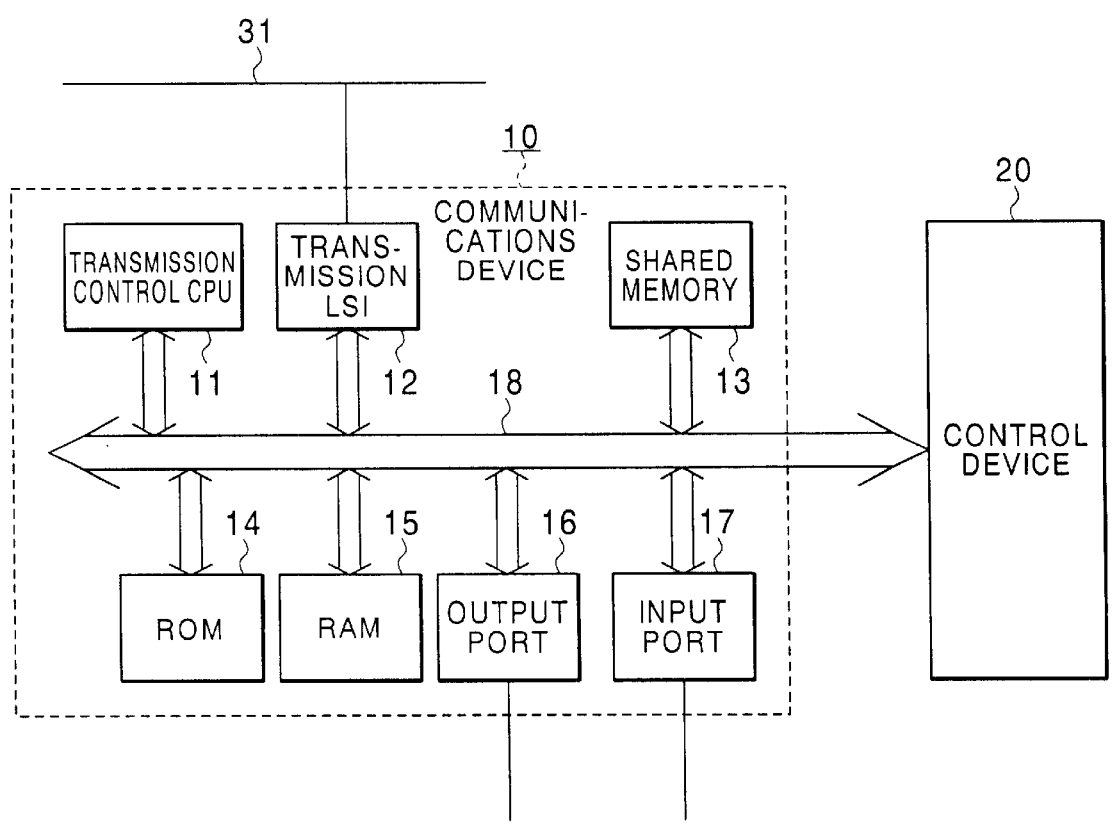
FIG. 2 is a diagram showing a construction of a communications device of a communications control system for elevators according to Embodiment 1 of the present invention.

Next, description will be made of a detailed structure of a communications device of each control unit, making reference to the drawings. FIG. 2 is a diagram showing the structure of the communications device of each control unit in the elevator communications control system according to Embodiment 1 of the present invention.

As shown in FIG. 2, the communications device 10 has a transmission control CPU 11 for controlling the communications device as a whole; a transmission LSI 12, being connected to a transmission line 31 joining each control unit, adapted to automatically conduct sending, receiving and transmission irregularity checking of transmission data under the control of the CPU 11; a shared memory 13 constructed of, for example, a two-port RAM accessible from both the CPU 11 and a control device 20 explained below; a readable non-volatile memory (ROM) 14 for storing programs and charts; a readable/writeable volatile memory (RAM) 15 for temporarily storing data; an output port 16; and input port 17; and a multi-bus for tightly coupling the above-mentioned components 11–17 and the control device 20.

Further, the shared memory 13 includes an FIFO format output queue for the CPU 11 to write data, and an FIFO format input queue for the CPU 11 to read data.

Further, the control device 20 in FIG. 2 corresponds to each control device 20A–20H shown in FIG. 1.

The communication device 10 performs sending and receiving processing of transmission data over the transmission line 31 via the transmission LSI 12 and the multi-bus 18, which are connected to the transmission line 31. Further, the communication device 10 performs exchange of data with the control device 20 through the shared memory 13 tightly coupled via the multi-bas 18. Furthermore, the primary logical destination for distinguishing between the control units, and setting information of, for example, function code are inputted from the input port 17 from an external setting device (such as a jumper line or a rotary switch: not shown in the diagram). Output control to an external display device (for example, an LED: not shown in the diagram) is performed from the output port 16.

FIG. 3 is a diagram showing a "function code correspondence table" of the control units. The table is for establishing correspondence among a "control unit function code", a "control function" and a "data type code" used by the control unit. The "control unit function code" is equivalent to the primary logical destination, and the "data type code" is equivalent to the secondary logical destination. The table is stored in advance in the ROM 14 of each communications device 10. Further, the table establishes a correspondence such that the "control unit function code" is "1" and the "control function" is a "group management control unit 1"; however, this is merely one example. A correspondence such that the "control unit function code" is "1" and the "control function" is a "elevator hall display control unit 7" is also possible, for example.

The function code for determining the control function of each control unit may be set via the input port 17, as explained above. For example, when the function code of a given control unit is set at "10" the control unit operates as an elevator hall registration control unit 5. The above description was made with the function code being inputted via the input port 17; however, it is also possible to input the function code first into the control device 20, and then take the function code into the RAM 15 of the communications device 10 via the shared memory 13.

FIG. 4 is a diagram showing a "data type code table". The table is also stored in advance in the ROM 14 of the communications device 10. The table establishes correspondence between the data type code and the meaning of the data actually being used.

In other words, the communications device 10 of the elevator hall registration control unit 5 uses a series A (data type code "1") of elevator hall call registration information which is data sent to the transmission line 31, and series A (data type code "3") of elevator hall registration lamp information which is data received from the transmission line 31.

Here, series A indicates an elevator hall call registration signal and elevator hall registration lamp signal for general use (for persons who are not physically handicapped), and series B indicates those for handicapped persons.

Further, series a and series a noted in FIG. 4 indicate destination floor registration information, for example, for a specific floor.

Next, description will be made of operations of the communications control system for elevators according to Embodiment 1, making reference to the drawings.

Figure 5:
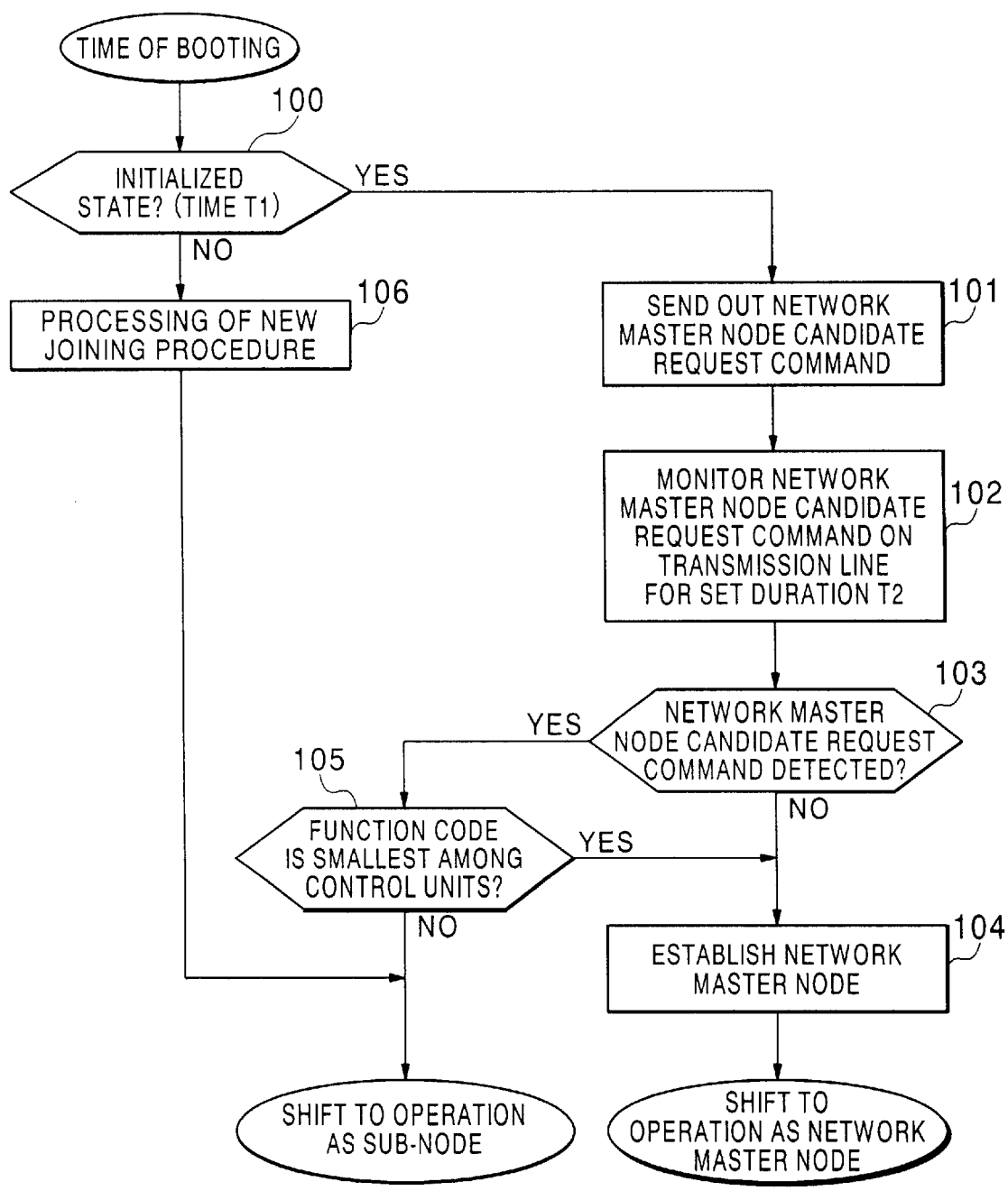
FIG. 5 is a flow chart showing a method of determining a network master in the elevator communications control system according to Embodiment 1 of the present invention.

First, description is made, making reference to the flowchart of FIG. 5, of the network master node for governing the synchronization controls among each control unit joined by the transmission line 31, and a method for determining a sub-node for obeying the network master node. The program represented in the flow chart is stored in the ROM 14 of the communications device 10.

The communications device 10 of each control unit proceeds to step 100 from its state upon having its power source turned on (i.e., at a time of booting).

At step 100, a judgment is made as to whether the communications device 10 is in an initialized state or not. Here, judgment is made as to whether other control units are already booted and communications controls via the transmission line 31 has become definite or not (i.e., whether the network has already been built or not). For this purpose, the communications device 10 monitors the transmission line 31 for a predetermined duration of time T1, and when no data is flowing therein judgment is made that the communications device 10 is in the initialized state, and the procedure advances to step 101. On the other hand, when the communications device 10 is not in the initialized state (i.e., when it joined the network mid-way through), processing of a procedure for new joining is performed at step 106 and the communications device 10 operates as a sub-node. Note, at this point, the communications device 10 of the control unit inputs in advance via the input port 17 the control unit function code having been set before the booting of the system Next, at step 101 a self-control unit sends out to the transmission line 31 a candidate request command to become the network master node. Further, the transmission format of the network master node candidate request command is, for example, the same as that shown in FIG. 8(a) explained below such that a data type field is a code for indicating the network master node candidate request command; a data head portion of the data field is the control unit function code inputted in advance indicating a candidate originator; and an application data portion of the data field is some appropriate value. Note, that the application data portion is not necessary, so it does not need to exist.

Next, there is a possibility that at step 100 other control unit were judged to be in the initialized state at the same time. Therefore, at step 102 the transmission line 31 is monitored for a predetermined duration of time T2 to determine whether there is a network master node candidate request command from another control unit.

Next, at step 103 judgement is made as to whether the network master node candidate request command from another control unit was detected or not. When one was not detected, the self-control unit becomes the network master node at step 104. When one was detected, at least one control unit other than the self-control unit sends out a network master node candidate request command all at the same time, and the procedure advances to step 105.

At step 105 judgment is made as to whether it is possible for the self-control unit to become the network master node or not. Here, the smallest control unit function code set in advance and inputted in advance by the communications device 10 of the control unit via the input port 17 becomes the network master node. In other words, the self-control unit becomes the network master node in the case where the control unit function code of the self-control unit is the smallest of the control unit function code of the self-control unit and the control unit function codes attached to the network master node candidate request commands from the other control units. When the self-control unit is judged not to be able to become the network master node, the self-control unit operates as the sub-node. Further, if the respective numeric sizes of the control unit function codes are set in the opposite pattern, then the inputted control unit function code having the greatest value becomes the network master node.

Figure 6:
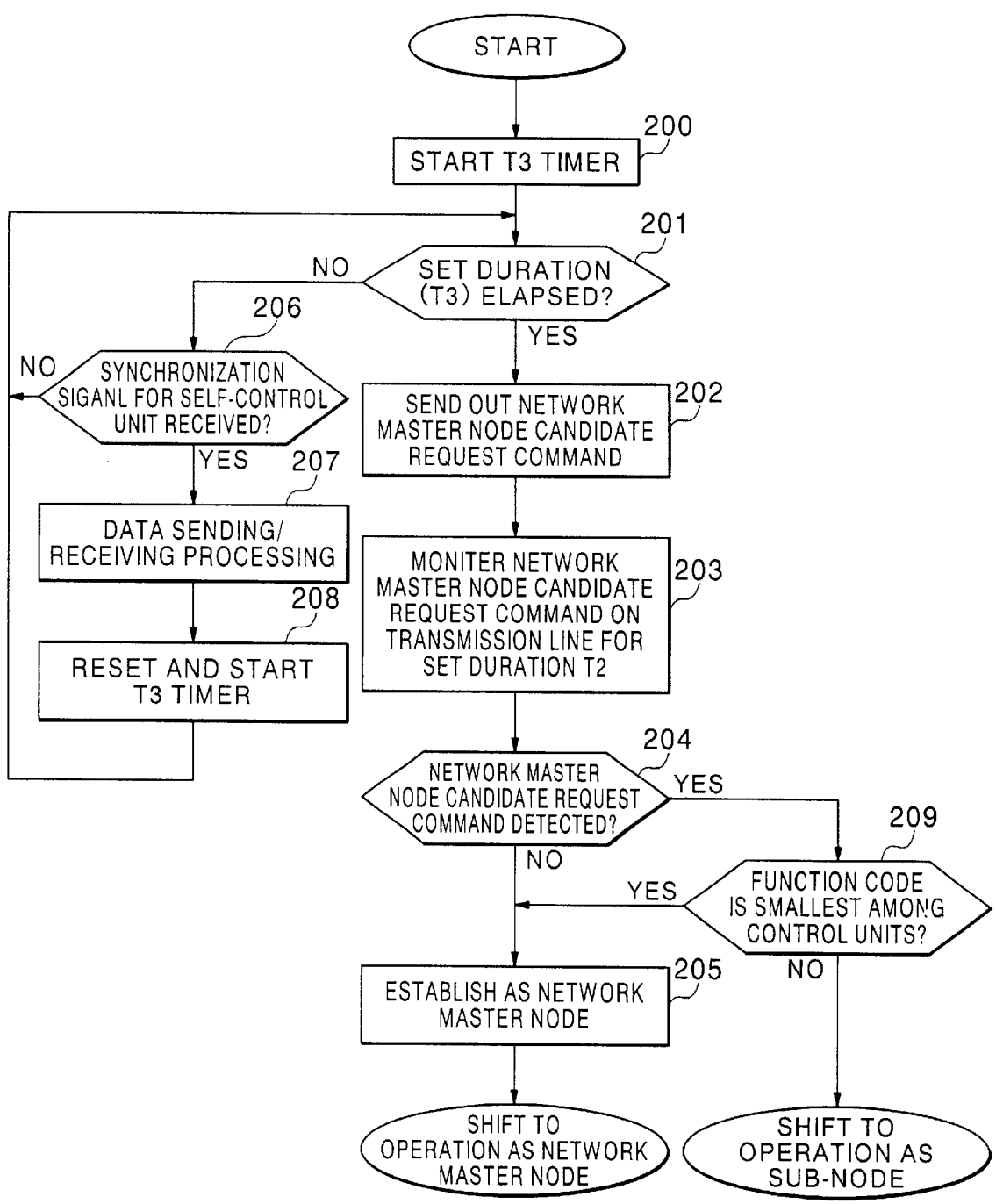
FIG. 6 is a flow chart showing a method of determining a subsequent network master when the network master is failing, in the elevator communications control system according to Embodiment 1 of the present invention.

Next, description is made making use of the flow chart of FIG. 6, of a method for determining a subsequent network master node when the network master node fails. The program represented in the flow chart is also stored in the ROM 14 of the communications device 10.

At step 200 the communications device 10 of each control unit operating as a sub-node makes a timer T3 for detecting the network master failure start.

Next, at step 201 a judgment is made as to whether a predetermined duration of time T3 has elapsed or not. When the duration of time T3 has not elapsed, the procedure advances to step 206. On the other hand, when the duration of time T3 has elapsed, that is when a synchronization signal from another network master node is not received, this indicates a failure of the network master node, so the procedure advances to step 202. After the step 202, operations of steps 202–205 step 209 are the same as steps 101–104 and step 105 in FIG. 5. Further, the synchronization signal may be a token, for example, as described further below.

At step 206, which occurs when the network master node exists and is not in the initialized state, judgment is made as to whether a synchronization signal to the self-control unit has been received or not. When it has been received the procedure advances to step 207. On the other hand, when it has not been received, a loop is formed from step 201 to step 206 to step 201, and the program waits for the receipt of the synchronization signal.

Figure 9:
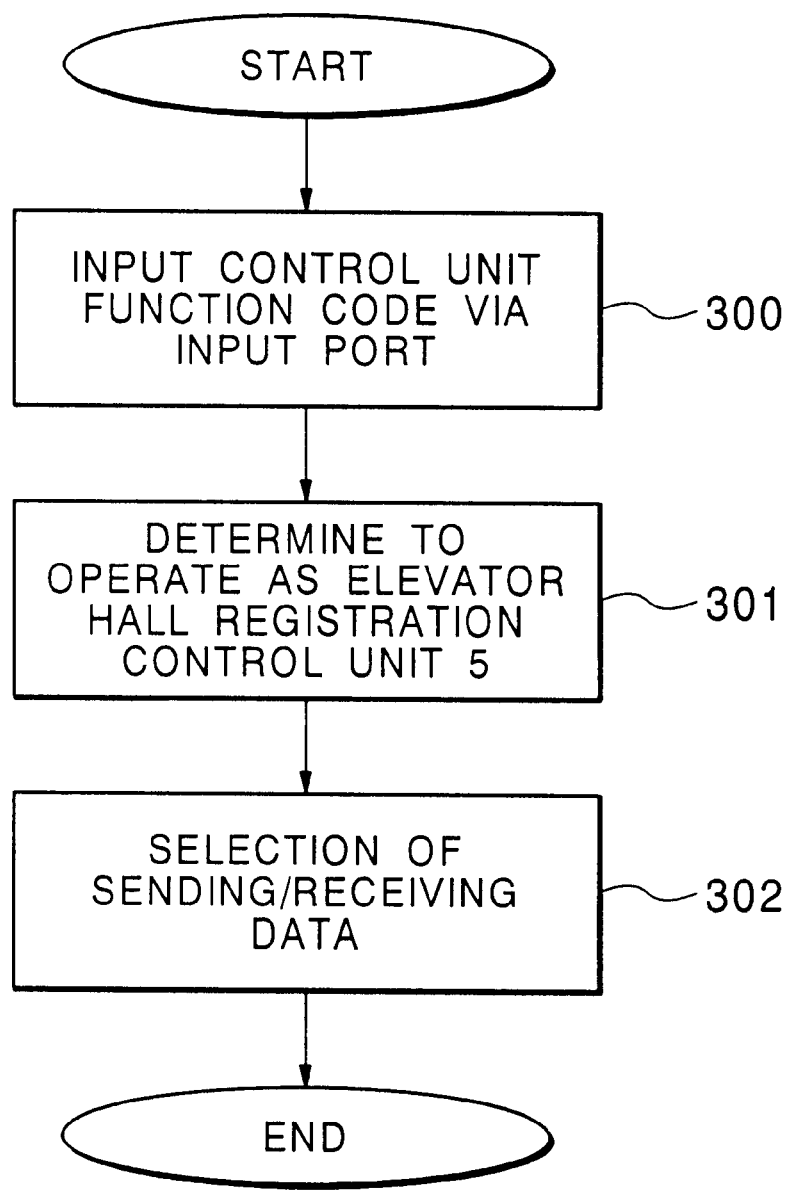
FIG. 9 is a flow chart showing a main operation of a control unit of the elevator communications control system according to Embodiment 1 of the present invention.
Figure 10:
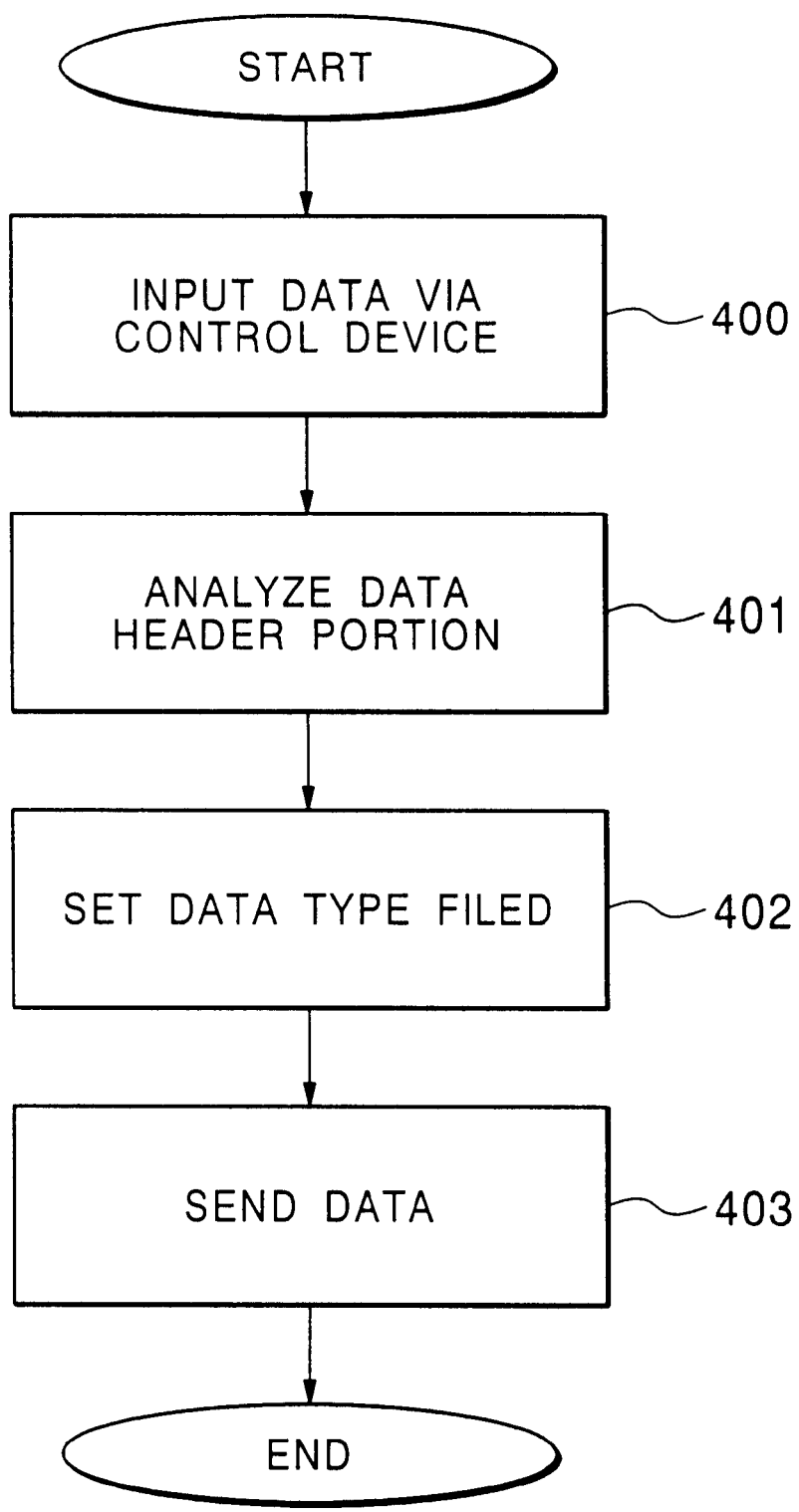
FIG. 10 is a flow chart showing a sending operation of the control unit of the elevator communications control system according to Embodiment 1 of the present invention.
Figure 11:
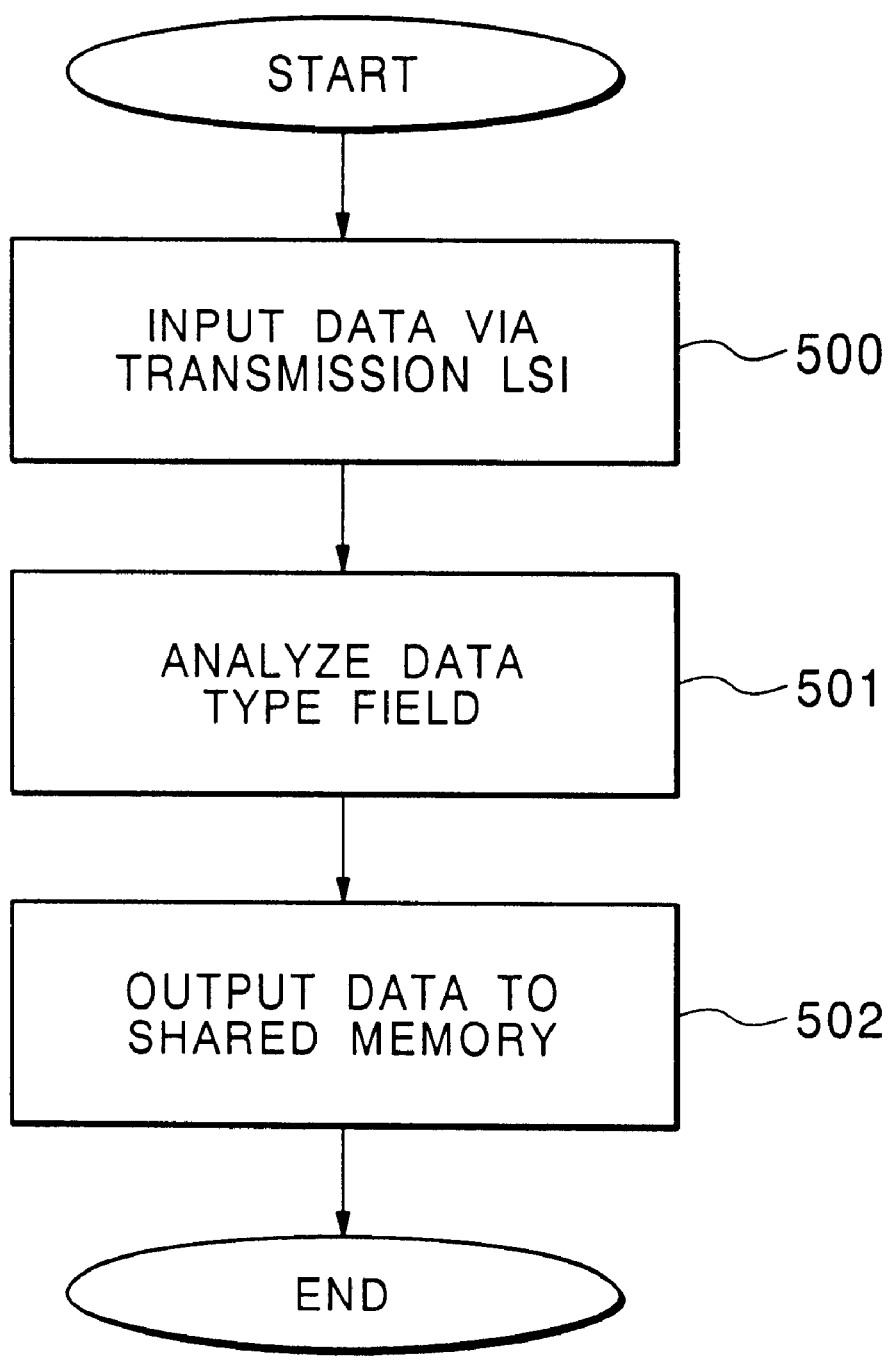
FIG. 11 is flow chart showing a receiving operation of the control device of the elevator communications control system according to Embodiment 1 of the present invention.
Figure 12:
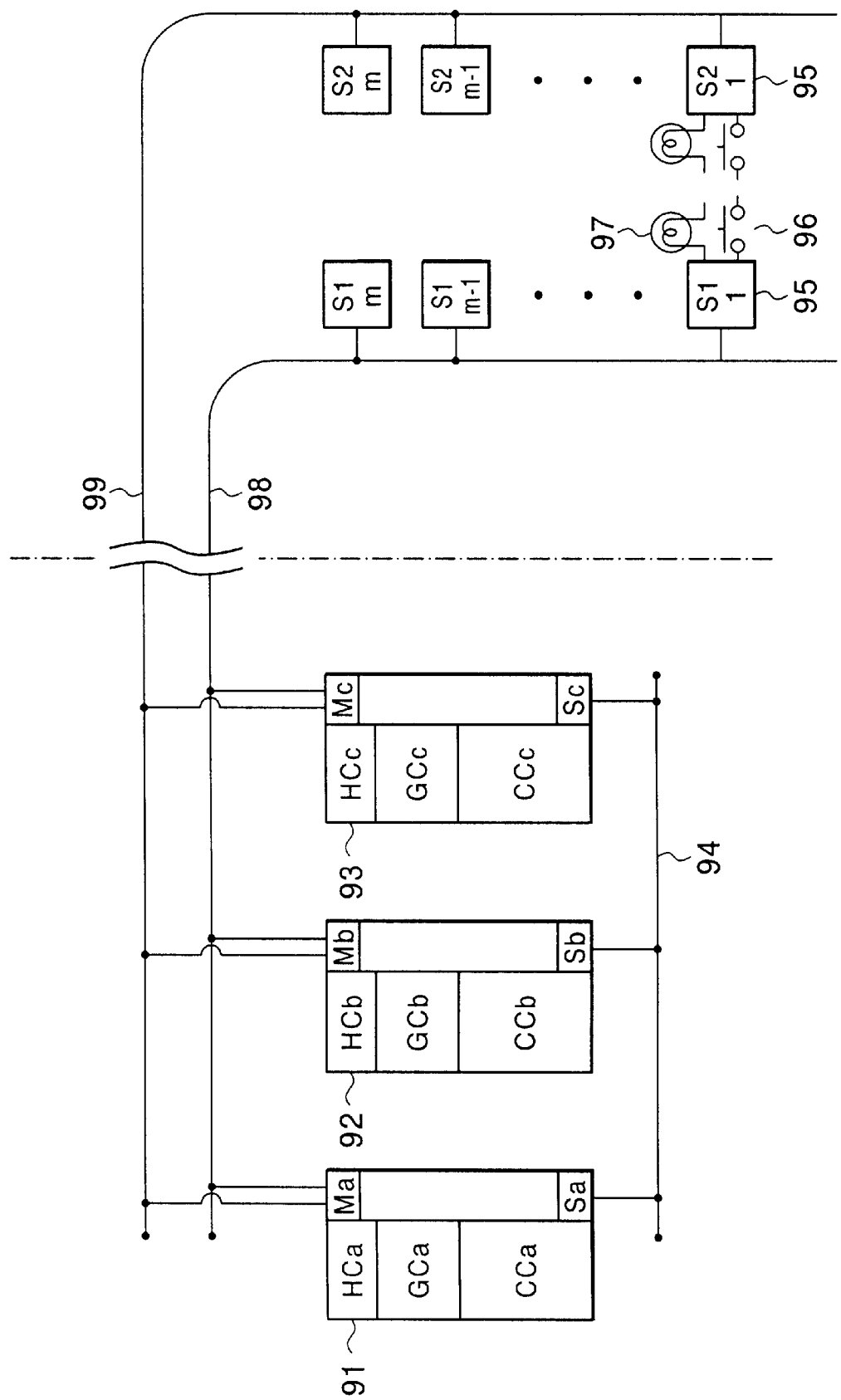
FIG. 12 is a diagram showing a structure of a conventional communications control system for elevators.

Next, at step 207, data sending and receiving processing are performed according to the flow charts in FIGS. 9–11.

Next, at step 208, the timer T3 for detecting the network master node failure is reset and made to start again.

Note that the set values of the amount of time for the timers T1, T2 and T3 are reset at appropriate places.

In the flowchart of FIG. 6, a control unit that does not advance to step 205 becomes a sub-node and operates in obedience to the synchronization signal of the network master node.

Further, when all the control units are in the initialized state all the control units have a right to become the network master node, and the control unit that outputs the network master node candidate request command to the other control units the soonest becomes the network master node. When the network master node is determined the remaining control units operate as sub-nodes.

When the network master node fails, too, in the processings of and after step 202, the sub-node (control unit) from among the remaining sub-nodes (control units) that outputs the network master node candidate request command to the other control units the soonest becomes the network master node.

Figure 7:
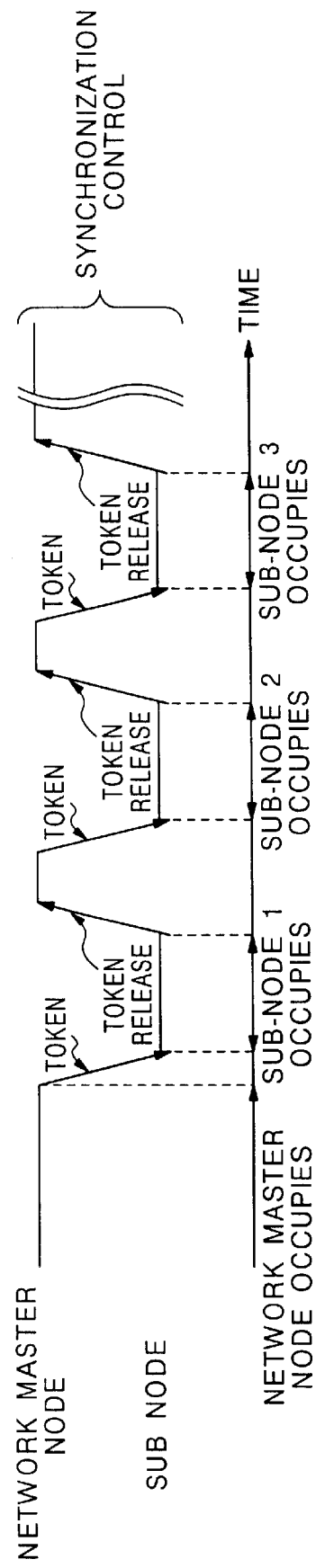
FIG. 7 is a diagram showing a synchronization control operation of the elevator communications control system according to Embodiment 1 of the present invention.

The synchronization control of the network master node may use a token polling/selecting format or a token passing format, for example, which are known technologies. FIG. 7 is a diagram showing an example of a token polling/selecting format for the synchronization control of the network master node.

In FIG. 7 the network master node (control unit) provides a token (a network occupation right) to a sub-node 1 (control unit).

Next, the sub-node 1 recognizes (receives) the token, and after that, acquires the network occupation right and sends necessary data to the network.

Next, after completing the sending of the data, the sub-node 1 performs a token release (notification of completion) to the network master node. Note that the transmission format of the token and the token release is, for example, the same as that shown in FIG. 8(a) explained further below, such that the data type field is a code indicating the token and the token release; the data head portion of the data field is the control unit function code indicating a sending source an a sending destination; and the application data portion of the data field is some appropriate value. Note that the application data portion is not necessary and does not need to exist.

Next, the network master node recognizes (receives) the notification of completion (the token release) from the sub-node 1, and after that, provides the token (the network occupation right) to a subsequent sub-node 2 (control unit).

Thereafter, the network master node repeats a similar sequence with each sub-node. That is, only the sub-node that has acquired the token (the network occupation right) may send data to the transmission line 31, and the network master node may send data to the transmission line 31 after receiving the token release.

Figure 8:
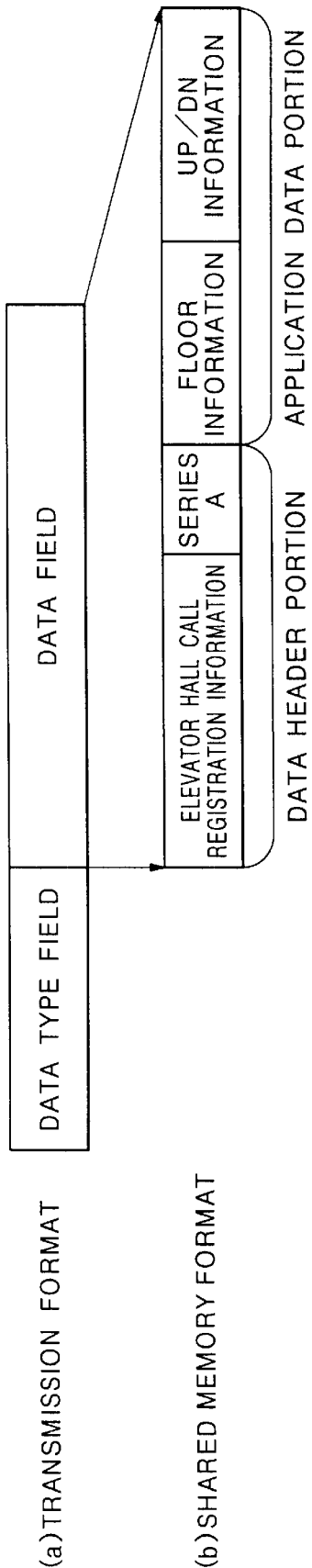
FIG. 8 is a diagram showing a data format of the elevator communications control system according to Embodiment 1 of the present invention.

FIG. 8 is a diagram showing a data format. Reference numeral (a) in the same figure shows a transmission format being constructed of a data type field and a data field. Further, reference numeral (b) in the same figure indicates a shared memory format being constructed of a data header portion and an application data portion. The data header portion and the application data portion correspond to the data fields explained above.

Now description will be made of operations of the control unit, making reference to FIGS. 9–11. The following description will be made using the elevator hall registration control unit 5 shown in FIG. 1 as an example.

FIG. 9 is a flow chart showing a main operation of the control unit to become the elevator hall registration control unit 5.

At step 300, the communications device 10 of the control unit inputs the control unit function code via the input port 17. In this example, the function code that is set in advance is inputted as "10"; therefore, as shown in FIG. 3, it may be understood that the communications device 10 operates as the elevator hall registration control unit 5 and the data used by the communications device 10 are the data type codes "1" and "3". Note, however, that if the network master node, and the control unit function code inputted before the determination of the sub-node—both of which were explained above—are stored in the RAM 15, for example, then the processing here of inputting the control unit function code may be omitted.

Next, at step 301 the communications device 10 of the control unit is determined to operate as the elevator hall registration control unit 5.

Then at step 302, the send data and receive data to use are selected from FIG. 4 and recognized. In this example these data comprises the elevator call hall registration information and the elevator hall registration lamp information of series A corresponding to the data type codes "1" and "3".

FIG. 10 is a flow chart showing a data transmission from an elevator hall registration control device 20E to the communications device 10 to the transmission line 31, being conducted by the multi-bus 18.

At step 400 the communication device 10 inside the elevator hall registration control unit 5 inputs the elevator hall call registration information by means of the elevator hall registration control device 20E. The elevator hall registration control device 20E inputs the elevator hall call registration signal via the transmission line 32 from an elevator hall button registration device 41 installed at the elevator hall on each floor, and writes the information in advance to an input queue inside the shared memory 13 via the multi-bas 18. The transmission control CPU 11 inside the above-mentioned communications device 10 inputs the elevator hall call registration information to the RAM 15 from the input queue inside the shared memory 13 via the multi-bas 18. One example of a format of the input data is shown in the shared memory format shown in FIG. 8(b).

Next, at step 401 analysis is performed of the data header portion of the data read from the input queue inside the shared memory 13. In this example, as shown in FIG. 8(b), the data header portion is the elevator hall call registration information series A; therefore, the above-mentioned communications device 10 extracts the data type code of "1" from the "data type code table" shown in FIG. 4.

Next, at step 402 the above-mentioned communications device 10 adds the data type code of "1" extracted at previous step 401 to the data type field in the transmission format shown in FIG. 8(a), and prepares the sending data.

Then, at step 403 the transmission control CPU 11 inside the above-mentioned communications device 10 sends the data indicated in the transmission format shown in FIG. 8(a) to the transmission line 31 via the transmission LSI 12. Further, the elevator hall registration control unit 5 sends the above data to the transmission line 31 while it has the token (the network occupation right). Note, however, that processing other than the sending processing is performed according to a different timing.

FIG. 11 is a flow chart showing receiving of data from the transmission line 31 to the communications device 10 to the shared memory 13 to the elevator hall registration control device 20E.

At step 500 the communications device 10 inside the elevator hall registration control unit 5 receives data from the transmission line 31 via the transmission LSI 12. The transmission format at the time of receiving is the one shown in FIG. 8(a).

Next, at step 501 the data type field of the received data is analyzed. The data type code being used is already known from the "function code correspondence table" shown in FIG. 3. Therefore, a judgment is made as to whether the data should be used for the received data as well, or not. In the present example, the data which the elevator hall registration control unit 5 should use are the data type codes "1" and "3", as shown in FIG. 3. Therefore, only the received data of the data type field of "1" or "3" is used. Note that in actual application the data type code of "1" is for sending; therefore, only the received data of the data type code of "3" would be used.

Then, when the judgment was made at step 501 that the received data is data which should be inputted, at step 502 the data is written to the input queue of the shared memory 13 in the shared memory format shown in FIG. 8(b). That is, the above-mentioned received data is outputted to the elevator hall registration control device 20E via the shared memory 13. Note that in the case depicted in the present example the data header portion of the above-mentioned received data becomes the series A of the elevator hall registration lamp information. operations of the other control units are similar. Points of difference are merely that the data header portion of the shared memory format and the application data portion shown in FIG. 8(b) change due to the data type code, so description is omitted here.

Further, the programs represented by the operation flow charts shown in FIGS. 9–11 are stored in the ROM 14 in each communications device 10.

As stated in the description of the above embodiment, all the data used by the control units is used as data representing the meaning of data type codes. In other words, the present system (elevator communications control system) is not a communication format such that a specific control unit is designated as a transmission partner from among the control units joined to the transmission line 31 and transmission is performed one-to-one with the partner. Rather, the present system is a format for designating the logical destination (i.e., the primary and the secondary logical destinations).

According to the present embodiment that adopt a format for designating the logical destination, each control unit may output meaningful data (logical data) via the transmission line 31 at the time of data sending and receive only the necessary data to the control unit at the time of data receiving.

The data that is necessary to each control unit is set in advance by means of the "function code correspondence table" shown in FIG. 3 and the "data type code table" shown in FIG. 4. Therefore, each control unit can be devoted to processing for sending and receiving the necessary data only, and it is possible to improve the processing power thereof.

In the conventional example, on the other hand, in addition to the car control unit a group control unit for group management control and a hall control unit for hall call control processing were also integrated into each control unit, so processing became complicated and processing power diminished.

Furthermore, according to the present embodiment, the method for determining the network master node for governing the synchronization controls among each control unit and the sub-node for obeying the network master node is configured in such a format that the network master node candidate request command is outputted to the bus; therefore, the time for booting the communications control system for group management of elevators being connected as a bus may be shortened.

In other words, the present embodiment is a group management elevator communications control system being inter-connected as a bus via the transmission line 31 (i.e., a bus), wherein functions of each control unit comprising the system are turned into sub-systems, and the group management elevator communications control system is equipped with these control units having a group management control function, a respective car control function, an elevator hall registration control function, an elevator hall display control function and an expansions control function. Further, the group management elevator communications control system is equipped with a back up function for the time of failure of the network master node governing the synchronization controls among each control unit.

INDUSTRIAL APPLICABILITY

As explained above, in a communications control system for elevators according to the present invention, a plurality of control units are inter-connected via a network and each control unit inputs its own logical destination from an external location in advance, the system comprises: a first control unit for detecting an initialized state of the network and operating as a network master node governing synchronization control among the plurality of control units when the control unit is the first to send out, to the network, a network master node candidate request having a logical destination of the first control unit attached thereto; and a second control unit for operating a sub-node obeying the network master node when the initialized state of the network is not detected, whereby an effect is produced such that the time needed to boot the communications control system being connected as a bus is shortened.

As explained above, in a communications control system for elevators according to the present invention, when the above-mentioned first control unit detects the network master node candidate request command from another control unit, if its own logical destination and the logical destination attached to the network master node candidate request command from the other control unit conform to specified conditions the first control unit operates as a network master node; and if specified conditions are not met, the first control unit operates as a sub-node, whereby an effect is produced such that the time needed to boot the communications control system being connected as a bus is shortened.

As explained above, in a communications control system fox elevators according to the present invention, when a control unit operating as a sub-node detects that the network master node is failing, if the control unit operating as the sub-node is the first to send out, to the network, a network master node candidate request command having the logical destination of the control unit attached thereto, the control unit operates as the network master node governing the synchronization controls among the plurality of control units, whereby an effect is produced such that the time needed for booting the communications control system being connected as a bus is shortened.

As explained above, in a communications control system for elevators according to the present invention, when the control unit operating as the sub-node detects the network master node candidate request command from another control unit and its own logical destination and the logical destination attached to the network master node candidate request command from the other control unit conform to the specified conditions, the control unit functions as the network master node, whereby an effect is produced such that the time needed for booting the communications control system being connected as a bus is shortened.

As explained above, in a communications control system for elevators according to the present invention, the plurality of control units are inter-connected via the network; each control unit inputs its own primary logical destination from an external location in advance; and each has a first correspondence table establishing correspondence among the primary logical destination used for identifying the control unit, an elevator control function and a secondary logical destination for identifying information used by the control unit, and a second correspondence table establishing correspondence between the secondary logical destination and the information used by the control unit, the elevator communications control system is equipped with a plurality of control units for referencing the first correspondence table and acting as an elevator control function corresponding to their own primary logical destination, whereby an effect is produced such that the control units may be devoted to sending and receiving of necessary data only and the processing power thereof may be improved.

As explained above, in a communications control system for elevators according to the present invention, the system comprises: a first control unit which references the first correspondence table and corresponds to its own first primary logical destination therein, and which acts as a respective car control unit for controlling ascending and descending of an elevator car; a second control unit which references the first correspondence table and corresponds to its own second primary logical destination therein, and which acts as an elevator hall registration control unit for controlling input processing of elevator hall call registration information from an elevator hall button registration device installed at an elevator hall on each floor, and output processing of elevator hall registration lamp information corresponding to the elevator hall call; and a third control unit which references the first correspondence table and corresponds to its own third primary logical destination therein, and which operates as a group management control unit for performing allocation controls for allocating an elevator in response to an elevator hall call registered based on the elevator hall call registration information, whereby an effect is produced such that the control units may be devoted to sending and receiving of necessary data only and the processing power may be improved.

As explained above, in a communications control system for elevators according to the present invention, each control unit refers to the second correspondence table; extracts the secondary logical destination corresponding to the information inputted from the external location; adds the secondary destination to the sending data and sends it to the network; and also extracts the secondary logical destination from data received from the network, and when the extracted secondary logical destination exists at a location corresponding to its own primary logical destination in the first correspondence table the control unit takes in the received data, whereby an effect is produced such that the control units may be devoted to sending and receiving of necessary data only and the processing power may be improved.

As explained above, in a communications control system for elevators according to the present invention, one of the plurality of control units detects an initialized state of the network and operates as the network master node governing the synchronization controls among the plurality of control units when the control unit is the first to send out, to the network, a network master node candidate request command having the primary logical destination of the control unit attached thereto; and the rest of the plurality of control units operate as sub-nodes obeying the network master node when the initialized state of the network is not detected, whereby an effect is produced such that the control units may be devoted to sending and receiving of necessary data only to improve the processing power, and also, the time needed for booting the communications control system being connected as a bus is shortened.

As explained above, in a communications control system for elevators according to the present invention, when one of the plurality of control units detects a network master node candidate request command from another control unit, if its own primary logical destination and the primary logical destination attached to the network master node candidate request command from the other control unit conform to specified conditions, the control unit acts as the network master node; and if they do not conform to the specified conditions the control unit acts as a sub-node, whereby an effect is produced such that the control units may be devoted to sending and receiving of necessary data only to improve the processing power, and also, the time needed for booting the communications control system being connected as a bus is shortened.

As explained above, in a communications control system for elevators according to the present invention, when the control unit operating as a sub-node detects that the network master node is failing, the control unit operates as the network master node governing the synchronization controls among the plurality of control units when the control unit is the first to send out, to the network, a network master node candidate request command having the primary logical destination of the control unit attached thereto, whereby an effect is produced such that the control units may be devoted to sending and receiving of necessary data only to improve the processing power, and also, the time needed for booting the communications control system being connected as a bus is shortened.

As explained above, in a communications control system for elevators according to the present invention, the control unit operating as a sub-node operates as the network master node when the control unit detects a network master node candidate request command from another control unit operating as a sub-node, and its own primary logical destination and the primary logical destination attached to the network master node candidate request command from the other control unit conform to specified conditions, whereby an effect is produced such that the control units may be devoted to sending and receiving of necessary data only to improve the processing power, and also, the time needed for booting the communications control system being connected as a bus is shortened.

What is claimed is:

1. A communications control system for elevators, in which a plurality of control units are inter-connected via a network and each control unit receives its own logical destination from an external location, the system comprising:

a first control unit for detecting an initialized state of the network and operating as a network master node governing synchronization control among the plurality of control units when the first control unit is the first to send out, to the network, a network master node candidate request having a logical destination of the first control unit attached thereto; and a second control unit for operating as a sub-node obeying the network master node when the initialized state of the network is not detected.

2. The communications control system for elevators according to claim 1, wherein, when the first control unit detects the network master node candidate request command from a third control unit, if its own logical destination and the logical destination attached to the network master node candidate request command from the third control unit conform to specified conditions, the first control unit operates as a network master node and, if the specified conditions are not met, the first control unit operates as a sub-node.

3. The communications control system for elevators according to claim 2, wherein, when a fourth control unit operating as a sub-node detects that the network master node is failing, if the fourth control unit operating as the sub-node is the first to send out, to the network, a network master node candidate request command having the logical destination of the fourth control unit attached thereto, the fourth control unit operates as the network master node governing the synchronization controls among the plurality of control units.

4. The communications control system for elevators according to claim 3, wherein, when a fifth control unit operating as the sub-node detects the network master node candidate request command from a sixth control unit and its own logical destination and the logical destination attached to the network master node candidate request command from the sixth control unit conform to the specified conditions, the fifth control unit functions as the network master node.

5. A communications control system for elevator, comprising:

a plurality of control units inter-connected via a network, each control unit receiving its own primary logical destination from an external location, and each control unit having a first correspondence table establishing correspondence among a primary logical destination used for identifying the control unit, an elevator control function, and a secondary logical destination for identifying information used by the control unit, and a second correspondence table establishing correspondence between the secondary logical destination and the information used by the control unit, wherein the plurality of control units reference the first correspondence table and provide an elevator control function corresponding to their own primary logical destinations.

6. The communications control system for elevators according to claim 5, comprising:

a first control unit which references the first correspondence table and corresponds to its own first primary logical destination, and which acts as a respective car control unit for controlling ascending and descending of an elevator car;

a second control unit which references the first correspondence table and corresponds to its own second primary logical destination, and which acts as an elevator hall registration control unit for controlling input processing of elevator hall call registration information from an elevator hall button registration device installed at an elevator hall on respective floors, and outputs elevator hall registration lamp .information corresponding to the elevator hall call; and a third control unit which references the first correspondence table and corresponds to its own third primary logical destination, and which operates as a group management control unit for allocation control of an elevator in response to an elevator hall call registered, based on the elevator hall call registration information.

7. The communications control system for elevators according to claim 6, wherein each of the control units;

refers to the second correspondence table;

extracts the secondary logical destination corresponding to the information input from the external location;

adds the secondary destination to the sending data and sends the sending data to the network; and extracts the secondary logical destination from data received from the network, and, if the extracted secondary logical destination exists at a location corresponding to its own primary logical destination in the first correspondence table, the control unit takes in the data received.

8. The communications control system for elevators according to claim 7, wherein a fourth of the plurality of control units detects an initialized state of the network and operates as the network master node governing synchronization controls among the plurality of control units when the fourth control unit is the first to send out, to the network, a network master node candidate request command having the primary logical destination of the fourth control unit attached thereto and the plurality of control units, except the fourth control unit, operate as sub-nodes obeying the network master node when the initialized state of the network is not detected.

9. The communications control system for elevators according to claim 8, wherein, when a fifth the plurality of control units detects a network master node candidate request command from a sixth control unit, if its own primary logical destination and the primary logical destination attached to the network master node candidate request command from the sixth control unit conform to specified conditions, the fifth control unit acts as the network master node, and if the primary logical destination of the fifth control unit and the primary logical destination attached to the network master node candidate request command from the sixth control unit do not conform to the specified conditions, the fifth control unit acts as a sub-node.

10. The communications control system for elevators according to claim 9, wherein, when a seventh control unit operating as a sub-node detects that the network master node is failing, the seventh control unit operates as the network master node governing the synchronization controls among the plurality of control units when the seventh control unit is the first to send out, to the network, a network master node candidate request command having the primary logical destination of the seventh control unit attached thereto.

11. The communications control system for elevators according to claim 10, wherein an eighth control unit operating as a sub-node operates as the network master node when the eighth control unit detects a network master node candidate request command from a ninth control unit operating as a sub-node, and its own primary logical destination and the primary logical destination attached to the network master node candidate request command from the ninth control unit conform to the specified conditions.

* * * * *